Jan. 5, 1971   D. L. JOHNSON   3,552,143
FISH COOLING AND PRESERVING SYSTEM
Filed Nov. 20, 1968   5 Sheets-Sheet 1

DAVID L. JOHNSON,
INVENTOR.

BY
*Alvin E. Moore,*
ATTORNEY.

Jan. 5, 1971   D. L. JOHNSON   3,552,143
FISH COOLING AND PRESERVING SYSTEM
Filed Nov. 20, 1968   5 Sheets-Sheet 2

DAVID L. JOHNSON,
INVENTOR.

BY
*Rvin E. Moore,*
ATTORNEY.

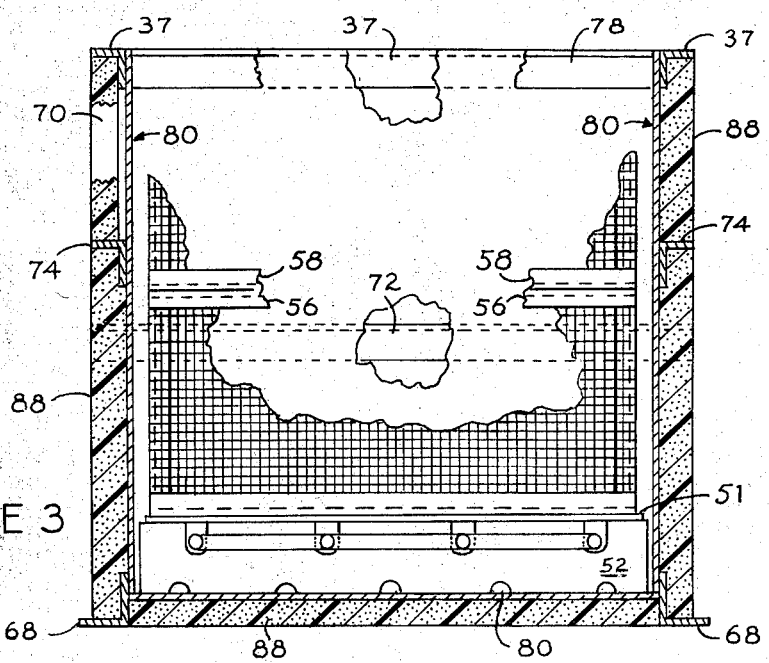
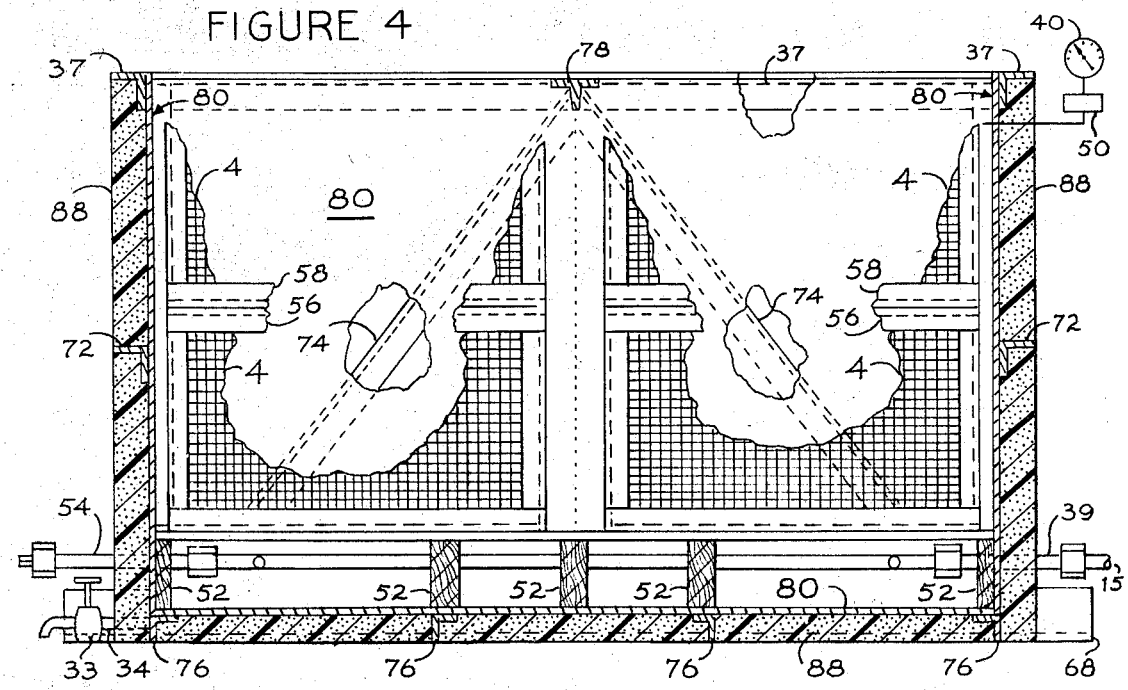
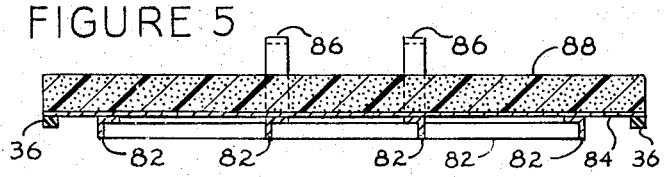

Jan. 5, 1971        D. L. JOHNSON        3,552,143

FISH COOLING AND PRESERVING SYSTEM

Filed Nov. 20, 1968        5 Sheets-Sheet 4

DAVID L. JOHNSON,
*INVENTOR.*

BY
*Alvin E. Moore,*
ATTORNEY.

Jan. 5, 1971  D. L. JOHNSON  3,552,143
FISH COOLING AND PRESERVING SYSTEM
Filed Nov. 20, 1968  5 Sheets-Sheet 5

DAVID L. JOHNSON,
INVENTOR.

BY
*Alvin E. Moore,*
ATTORNEY.

United States Patent Office 3,552,143
Patented Jan. 5, 1971

3,552,143
FISH COOLING AND PRESERVING SYSTEM
David Lee Johnson, Waveland, Miss., assignor of fifty percent to Marion Luther Dodson, M.D., Waveland, Miss.
Filed Nov. 20, 1968, Ser. No. 777,387
Int. Cl. F27b *19/00;* F17c *7/02*
U.S. Cl. 62—514                    15 Claims

ABSTRACT OF THE DISCLOSURE

An apparatus and method, using boiled-off gas from liquid nitrogen, for cooling and preserving fish, meat or other spoilable products, especially adapted to cool fish (for example, shellfish) on fishing vessels. It comprises a box (placed in the hold of a fishing craft and easily opened from its top only), a removable wire-mesh basket or set of baskets in the box, means for supplying cold gaseous nitrogen from the bottom of the box, upward thru the basket and spoilable products, and means to maintain the gas at above-atmospheric pressure while it is in the box. This pressure forces nitrogen into the fish, thus cooling it and also preserving it against attack by aerobic bacteria. After the basket means is filled it and its cooled contents may be easily removed from the box.

---

This invention pertains to a system for cooling and simultaneously preserving fish or meat in temporary storage, and is adapted to facilitate further transfer of the cooled product. Although this cooling may be effected in a motor truck, railroad car or packing plant, it is preferably performed on a marine vessel; and the system is especially adapted for use on fishing boats. At present the larger fishing vessels usually have heavy, cumbersome, mechanical refrigerating systems which initially are very expensive and often require expensive repairs that militate against efficient cooling. And the smaller vessels usually cool with ice, which requires delay in loading, does not sufficiently cool the fish, and does not destroy aerobic bacteria in it. Ice cools fish down only to approximately 43 degrees Fahrenheit; but for safe cooling and freshness of the fish the Federal Food and Drug Administration and the U.S. Department of Interior recommend that it be cooled to approximately 35° F. (no higher than 37° F., and no lower than 32°). Ice-cooling also has the defect of supplying both moisture and oxygen (in the water vapor), which accelerates the growth of bacteria with resultant early spoilage, especially at the ice-cooled temperatures, which are above forty-two degrees. Both the mechanical refrigerating system and the ice cooling necessitate multiple handling and bruising of the fish—in throwing them into the holds and throwing ice over them, taking them out of the holds, placing them in baskets, and in several other times of repacking the fish. An urgent need thus exists for obviating the above defects in an efficient, light-weight and economical cooling system.

Accordingly, an object of this invention is to provide apparatus and a method for the cooling of fish (especially shellfish) by means of evaporating liquid nitrogen.

A further object is to produce a system for cooling fish, meat or other spoilable products by vaporization of a liquified gas.

Another objective is to provide apparatus and a method for cooling spoilable material in a box, thru which cold nitrogen gas flows upward under a pressure above that of the atmosphere.

Another purpose is to invent such apparatus and a method by which fish or meat is cooled and simultaneously is preserved by elimination of the oxygen which aerobic bacteria requires for existence.

A further objective is to provide maximum and economical cooling of fish or meat from a liquid-nitrogen source by utilizing the normal gaseous boil-off to precool an insulated box before the insertion of the product to be cooled.

Some other objects of the invention are to provide: (1) a liquid-nitrogen system for cooling fish on a vessel, comprising a fish-supporting basket or case, multiply apertured for the passage of nitrogen thru it and easily removable, with its contents, from the craft; (2) such a system that is incorporated in apparatus which, excepting its liquid-nitrogen tank and valving, may be installed in existing relatively small holds of smaller fishing vessels; (3) an insulated box, connected to a source of liquid nitrogen, temporarily holding a fish-containing wire-mesh basket thru which the nitrogen boils, and means for maintaining sufficient gaseous pressure in the box to cause the fish to be partially impregnated with nitrogen, thus preserving it against aerobic bacteria; (4) such an insulated box containing at its bottom a vaporizer, thru which the cold nitrogen gas passes on its way upward thru the box and fish; (5) on a marine vessel, a cryogenic method and apparatus, utilizing liquid nitrogen, that complies with the dual-safety requirement of the U.S. Coast Guard.

The foregoing and other objects of the invention will become more readily apparent from the following specification, in connection with the accompanying drawings, in which.

Figure 2:
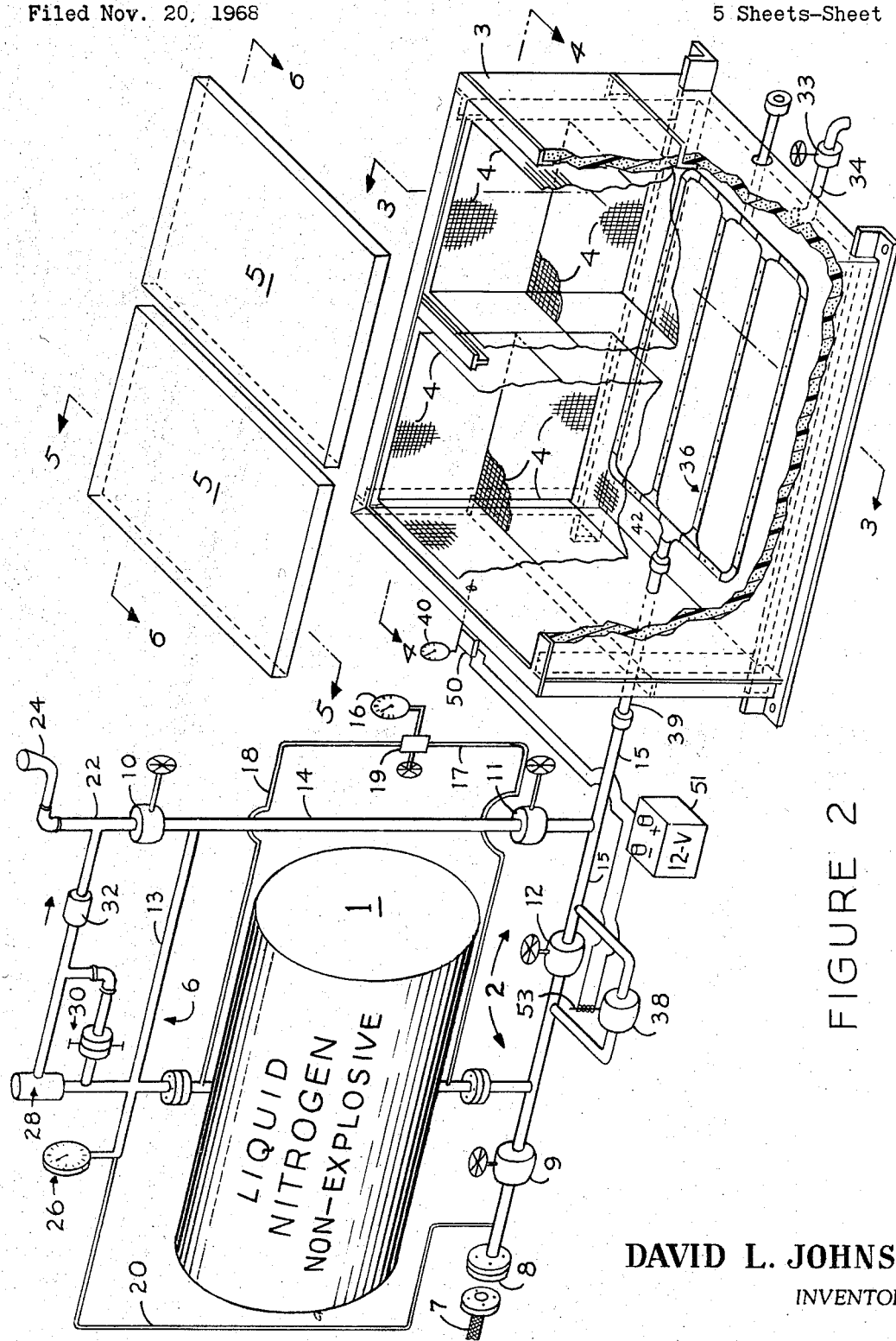
FIG. 2 is a perspective view of the apparatus used, partly shown as broken away.

FIG. is an enlarged detail view of the box, basket means and vaporizer, in section from the plane indicated by the lines 3—3 in FIG. 2.

FIG. 4 is a detail view in section from the plane 4—4 in FIG. 2.

FIG. 5 is a detail view in section thru one of the box covers from the plane 5—5 in FIG. 2.

Figure 6:
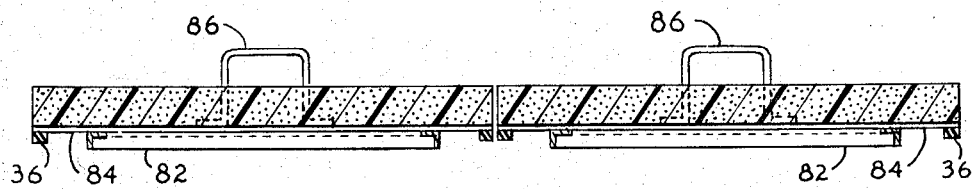

FIG. 6 is a detail view in section thru two of the covers from the plane 6—6 of FIG. 2.

Figure 7:
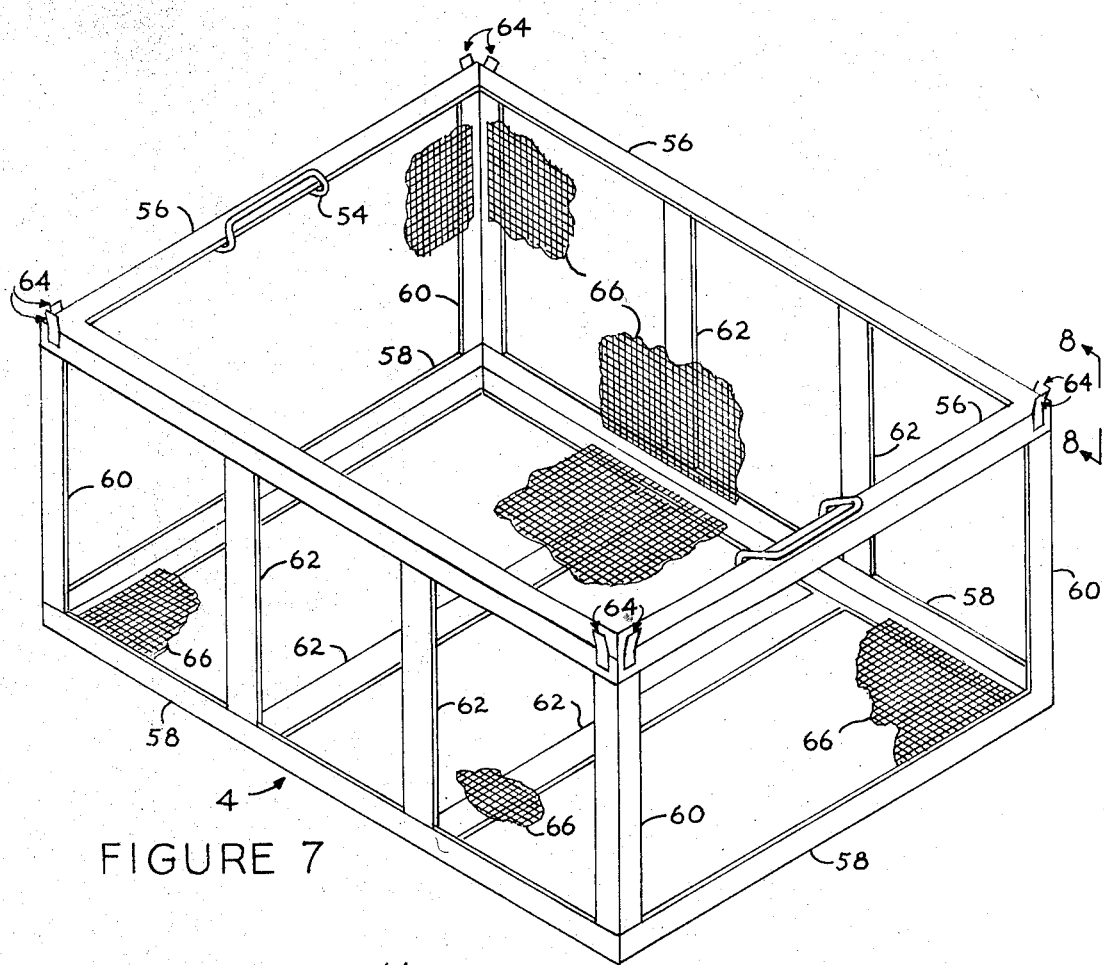

FIG. 7 is a perspective, detail view of one of the baskets, showing in convenience of illustration, most of its wire mesh as broken away.

Figure 8:
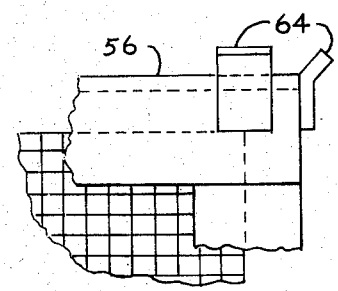

FIG. 8 is an elevational detail view indicating the basket corner means for holding upper baskets in place on the lower baskets.

Figure 9:
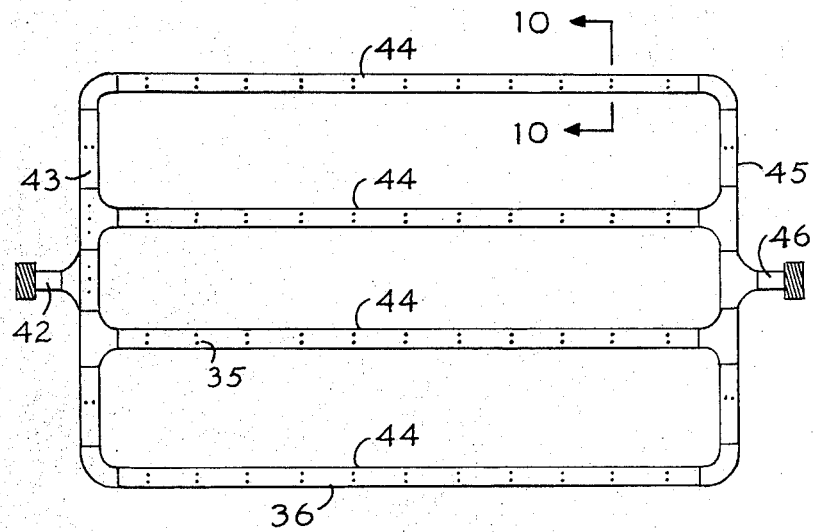

FIG. 9 is a top plan view of the nitrogen vaporizer.

Figure 10:
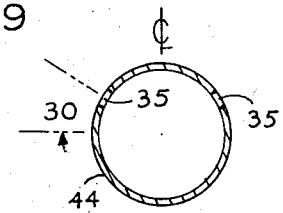

FIG. 10 is an enlarged sectional view from the plane 10—10 of FIG. 9.

Figure 11:
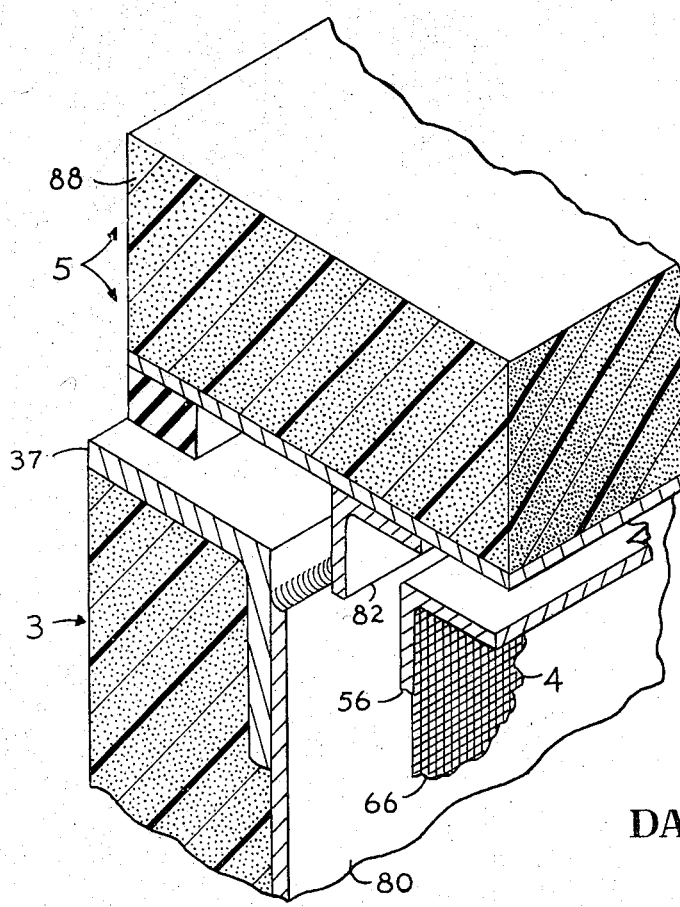

FIG. 11 is a perspective, detail view, partly broken away, and in section along vertical planes thru assembled, adjacent sides of the box, basket and cover.

Figure 1:
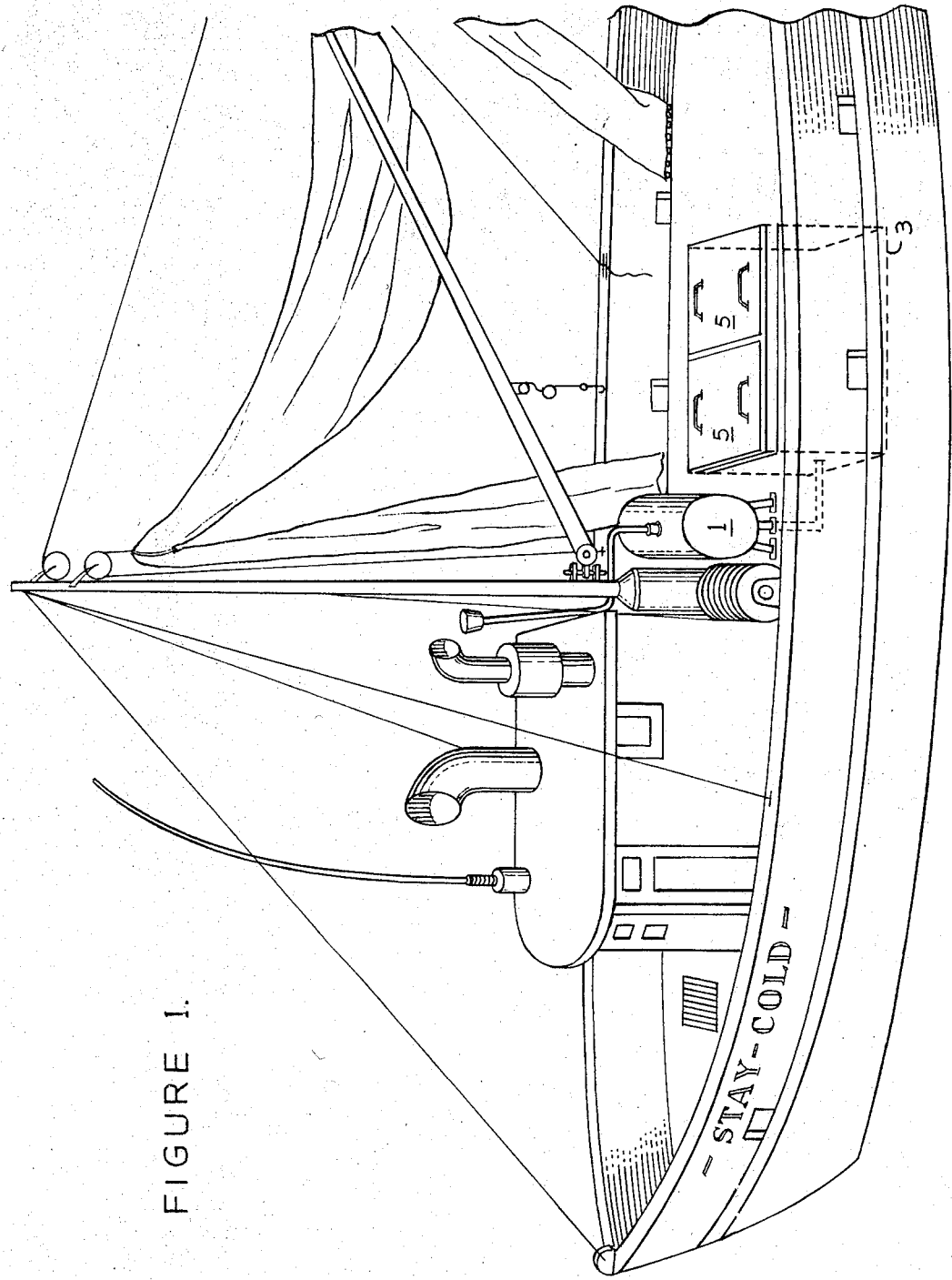
FIG. 1 is a perspective view of a fishing boat, partly shown as broken away, with the invented nitrogen-cooling system installed on it.

Shown in FIG. 1 as installed on a boat, and in FIG. 2 as illustrating its components, the system comprises: a liquid nitrogen storage tank, 1; valved means, 2, for conveying nitrogen from the tank to the fish box; the fish box, 3, installed in the hold of the boat; wire-mesh basket means, 4, which optionally may be a single basket, but preferably and as shown comprises a plurality of the apertured members; box cover means, 5, shown as comprising two separately removable covers; and a safety-venting system 6. The position of the box-entry means only at the top of the box and its easy removability are important in efficient operation of fishing vessels.

The insulated storage tank 1, optionally vacuum-jacketed or comprising cellulous insulation, contains liquid nitrogen. Although certain other liquefied gases may be used in the system, nitrogen, being inert, plentiful, economical and destructive of aerobic bacteria is preferred.

Aerobic bacteria, very deleterious to fish or the like, thrive in any gas that contains oxygen, and therefore the storage tank 1 contains only nitrogen or equivalent non-oxygen-containing gas. Nitrogen not only destroys aerobic bacteria, but since it is lighter than air and enters the box only at its imperforate bottom it entrains in its upward movement any air that is at the bottom or later is admitted with a supply of fish.

To initially inert and fill the storage tank 1, a land or ship based liquid-nitrogen storage tank, with attached flexible hose 7, is connected to the boat-mounted liquid-nitrogen fill line by removing the blind flange 8. With valves 9, 10, 11 and 12 open, the pumping means of the supply system is actuated, permitting a flow of aerobe-supporting boiled-off gaseous nitrogen to sweep the entire system, to remove all traces of air. To insure its entire evacuation, the valves are preferably actuated in sequence, permitting a maximum gas flow through each of the branch lines 13, 14, and 15. After this inerting, the gas discharge valve 11 and the cryogenic dump valve 12 are closed, with the cryogenic fill valve 9 and the vent valve 10 remaining open. The liquid flow from the supply system now begins and the boat-mounted storage tank is filled with liquid nitrogen to the required level, indicated by the level indicator 16. This element senses the delta pressure of the liquid head between the top and bottom of the tank 1 through pressure sensing lines 17 and 18, a three-way calibration and sensing valve 19.

On completion of this filling operation, the supply valve of the supply system and the fill valve 9 are closed. Any liquid trapped between the supply system and the fill valve boils off and is vented through the purge line 20, line 13, vent line 22 and vent stack 24 to the atmosphere. The flexible hose 7 is now disconnected and blind flange 8 reinstalled.

To provide maximum safety and compliance with the U.S. Coast Guard and Navy Bureau of Ships requirements, the system is equipped with an ullage tank pressure indicator 26 (0–50 pounds per square inch, gage pressure-p.s.i.g.), a pressure relief valve, 28, set at a 30 p.s.i.g. opening-pressure, and a safety-burst disk, 30, set at 35 p.s.i.g. burst pressure. To further insure the integrity of the relief valve 28 and the burst-disk 30, a check valve 32 is installed top prevent any back pressure on the relief valve or burst-disk.

To provide maximum utilization of the gas during its boil-off, utilizing its cooling capability to precool the storage box 3, the gas discharge valve 11 is now opened, and the vent valve 10 is closed. All the boil-off of the liquid nitrogen is thus conveyed to the box. This gas is boiling off the cryogenic liquid at all times; but only in an unlikely emergency in the cooling operation of this system is it shunted from the box-supplying pipes and thus wasted. One of the important features of this invention is this utilization of the boiled-off gas in precooling the box, thus making the use of liquid nitrogen economical and practical in the cooling of fish or meat.

During this precooling of the box condensation forms on its inside surfaces. To drain this off, valve 33 is opened for a while, permitting the condensed water to flow through the drain pipe 34. During this drainage a small amount of nitrogen gas escapes thru the drain pipe, but as soon as the flow of condensed water stops the valve 33 is closed.

All the boil-off nitrogen now goes thru the apertures 35 of the vaporizer, upward thru the mesh of the basket means, and out of the box at its top, with the gaseous pressure inside the box maintained at a desired pressure of approximately one-fourth of a pound p.s.i.g. Although this approximate pressure may be effected by a relief valve, it is preferably done by controlling the weight of the cover and by utilizing a movable sealing gasket on the cover. In a crude way of performing the method of this invention, a separate weight may be removably attached to the cover for this purpose, but preferably the method step involved is performed by placing over the box and its inclosed basket a cover, flanged for its guidance when it lifts or closes, that has a predetermined weight, calculated to cause at least one edge of the cover to lift when the approximate desired gaseous pressure is exceeded.

In the illustrated example of this cover means, with especial reference to FIG. 5, the weight of each of the composite covers 5 is so related to its area that is exposed to the gas that the total force on the cover causes one or more of the bottom surfaces of its sealing gasket 36 (of semi-hard rubber, epoxy-glued to the cover) to lift off the cover-supporting flange 37. During this slight lifting and closing of the cover it may be kept in position over the box by hinges on one of its sides, but preferably and as shown it is guided by flanges 82.

During the precooling of the box the liquid-nitrogen control valve means (38 and/or 12) is closed, so that only the boil-off gas (and no liquid) goes out of the tank. This gas flows to the box via pipes 13 and 14, with the valve 10 closed, and gas-supply valve 11 open.

Immediately before fish are placed in the box, this boil-off gas valve 11 is closed, and the liquid-nitrogen control valve means (38 and/or 12) is opened. When, as is preferable, this valve means includes solenoid-operated valve 38, this valve 38 now opens because the precooled temperature in the box is above the desired fish-cooling temperature and the thermostat 50, being sensitive to the box temperature, sends current to the solenoid and the valve 38. Liquid nitrogen now goes thru pipe 15 and into pipe 39, where it begins to vaporize.

As fish (for example, shrimp or other shellfish) are caught, one of the storage box covers 5 is removed, the fish are placed in one of the wire-mesh baskets. Although the cover is quickly replaced, some air, as well as aerobic bacteria, thus enters the box, but this small amount of oxygen-containing air is shortly entrained in the upward flow of nitrogen from the bottom of the box, and thus carried out of it, with the escaping nitrogen at a lifted edge of the cover.

When the manually-operated control 12 of the nitrogen flow is used the storage box temperature indicator 40 is observed, and to lower the box temperature this cryogenic dump valve 12 is manually adjusted to permit additional flow thru the storage box vaporizer 36, thus dissipating the amount of heat added by insertion of the fish. This adjustment is required from time to time as the fish are loaded into the storage box 3, unless, as is preferable, the automatic, solenoid control of nitrogen flow is used.

The nitrogen gas passes thru a vaporizer inlet line 39 and into the storage-box vaporizer 36. This element, shown in detail in FIG. 9, comprises the following group of tubes: the inlet pipe 42; the inlet header 43; a plurality of parallel tubes, 44; end header 45; and normally closed outlet pipe 46. The boiled-off gas cools the box 3, including its internal components (by B.t.u. extraction) until equilibrium is reached between: the internal heat of the box plus the heat influx in terms of B.t.u.'s; and the heat being extracted (in terms of B.t.u.'s) of the cold nitrogen gas. To continually cool the box to a desired temperature of approximately +35 F., the gas discharge valve 11 is closed and the solenoid-operated, liquid-supply valve 38 is automatically opened from time to time to permit the desired flow of liquid nitrogen through the liquid-inlet line 15, the vaporizer inlet line 42 and into the vaporizer 36. The amount of liquid nitrogen flow each time is determined by the solenoid-controlled valve-operating means which comprises the thermostat 50 (sensitive to the temperature in the box), the battery 51, solenoid 53, and the connections between them. And the box temperature is continuously indicated by the temperature indicator 40. Alternatively, but not preferably, this control may be effected by manually throttling dump valve 12, as explained above. In any event, the control insures that the proper amount of liquid nitrogen passes through a valve and is vaporized in pipes 39 and 42 and vaporizer 36, to maintain a constant temperature as set by the thermostat 50. At the same time the pressure inside the box is maintained at approximately one-fourth of a pound p.s.i.g.

As illustrated in the drawings, with especial reference to FIGS. 2, 3, 4 and 7, the baskets 4 and their assembly are designed to facilitate their easy removal, loaded with fish, and subsequent transport of the fish off the boat. The lower baskets rest on a rectangular aluminum-alloy frame, 51 (FIG. 3), which is fixed to beams 52. These beams may be I-beams of aluminum alloy or other metal, but preferably, as indicated in FIGS. 3 and 4, they are of wood. Each of the baskets has a pair of handles 54. Each of these handles comprises a bent, looped rod, the lower aligned ends of which fit in and may be pivoted relative to a pair of aligned sleeves that are welded to the angled flange 56 on the basket (FIG. 7). This pivoting permits the handles to be rotated out of the way of close assembly of the top and bottom baskets and of the top basket inside the cover. Each basket also comprises other strengthening, angled flanges, 58 at the bottom of the mesh and 60 at the upright corners of the basket, and is further strengthened by the flat aluminum-alloy bars 62.

As shown in FIGS. 4 and 5, the lower angled flanges 58 of each upper basket rest on the top flanges 56 of a lower basket. For correct alignment of the baskets in their assembly and to prevent their sidewise movement in the box, the upper, outer corners of the lower basket, adjacent the walls of box 4, are topped by a pair of aluminum-alloy basket retainer clips 64 (shown in FIGS. 7 and 8). These clips may be unitarily joined in a single holding means, but as shown are separately welded to tops of flanges 56.

The network 66 of the baskets is preferably of aluminum alloy wire, of sufficient diameter to hold the maximum load of fish in the basket. The width of the bars 62 and the span between each pair of them is so related to the wire diameter and strength of the network 66 as to prevent deformation of the basket bottom under this maximum load.

After the fishing operation is over the catch is unloaded at a dock or alongside a larger vessel. This may be done by hand or with the aid of a lifting rig. In either case, the covers 5 are removed and set aside and the baskets are lifted by means of the lifting handles 54. These handles are manually grasped or placed over hooks of a lifting rig, and thus the baskets are moved out of the box. The covers are now replaced, valves 12 and 38 are closed, and valve 11 opened.

The baskets may now be immediately emptied, or they may be further used as temporary fish holders, in a cooling or packing plant or on a vehicle for further transport. Such further use eliminates need of repeated transfers of the fish.

After the unloading of the box the same or other baskets are placed in it, the covers are replaced, and liquid nitrogen in the tank continues to boil off, maintaining a precooling temperature in the box, holding it in readiness for a subsequent fish-cooling operation.

To insure durability, prevent the necessity of maintenance, and provide lightness of weight nearly all the parts of the box and baskets are preferably made of aluminum alloy and are of welded connections. But alternatively other corrosion-resistant materials—for example, stainless steel—may be used. Specifically, the following parts are preferably made of aluminium alloy or stainless steel: the upper box flange 37 (made of four angles that are welded together); the bottom box flange 68 (made like 37); the four angled corner posts 70; the box-end braces or stiffeners 72 (welded to corner posts 70), the box-side diagonal stiffeners 74; the bottom stiffeners 76; the box-center support 78; the box-liner 80 (made of sheets of metal, seam-welded together and stitch-welded to the above-described, integral supporting frame); the angled cover frame 82; and all parts of each basket are made of aluminum alloy or stainless steel, the mesh preferably being of woven wire and the frame being of welded construction.

As indicated in FIGS. 6 and 11, the frame 82, fixed to the bottom plate 84 of the cover, has a peripheral, depending flange which, when the cover is on the box, is within and approximately parallel to upright walls of the box, fitting in its top opening. It aids in holding the easily removable cover in place when one or more of its edges lifts to allow escape of gas.

The top, bottom and side walls of the box and cover comprise insulation 88. Although this insulation may be fibrous or comprise vacuums, it preferably is of foamed plastic—for example, rigid or semi-rigid polyurethane foam.

The vaporizer 36 is made of lengths of copper, stainless steel or aluminum-alloy pipe, connected by welded, soldered, threaded or brazed fittings. And the pipes between the vaporizer 36 and tank 1 are preferably of stainless steel or aluminum-alloy tubing. All the pipes outside the box are covered with preformed insulation.

One of the important features of the invented system is its simultaneous cooling and destruction of bacteria. The vaporized nitrogen is so cold that, unlike the ice that is commonly used on smaller fishing vessels, it brings the temperature of the fish (or meat) down to the temperature of about 35° F. which is necessary to prevent growth of bacteria. And unlike both the cumbersome ice and the cumbersome, complicated and expensive mechanical refrigeration of larger vessels, the cold nitrogen, flooding upward and replacing air in a box, prevents the accumulation of bacteria-supporting moisture on the cooled product, and at the same time its pressure forces the nitrogen into the fish or meat. The resulting pore-filling nitrogen kills aerobic bacteria in the efficiently cooled product.

Within the scope of the following claims, various changes in the specific disclosed apparatus and method may be made. In the claims the word "meat," unless otherwise qualified, is used to mean fish or animal meat.

I claim:

1. A system for cooling products that are attacked and spoiled by aerobic bacteria, comprising:
   a tank;
   pressurized, liquefied, lighter-than-air, non-oxygen-containing gas in said tank;
   a container for holding material subject to spoilage by aerobic bacteria, having bottom and upright walls, sealed against passage of gas through said walls, and an open top;
   apertured vaporizer means, entirely located in the bottom part of said container and extending substantially throughout the bottom thereof, supported by lowermost portions of the said walls, for supplying cold, lighter-than-air gas upward through the container and spoilable material; apertured support means for holding said material above the bottom of said container;
   connecting means for flow-connecting said tank and vaporizer means; and
   easily removable cover means, comprising a bottom plate, removably supported on upper edges of the said upright walls and a peripheral, depending, cover-strengthening and cover-guiding flange, fitting within the upper portions of the upright walls; the said cover means having a predetermined weight which, in relation to the cross-sectional area of the part of the cover that is within said depending flange, is calculated to cause the cover to lift off at least one of said edges when an approximate predetermined pressure within the container is exceeded.

2. A system as set forth in claim 1, comprising a sealing gasket between the said bottom plate and upper edges of the upright walls.

3. A system as set forth in claim 1, in which said support means comprises: a casing for holding an amount of said spoilable material, located inside said container and above said vaporizer means, having holes in at least its bottom portion through which said cold gas flows on its way up from the vaporizer means to the top part of said container; and means on the said bottom wall for supporting said casing above the vaporizer means.

4. A system as set forth in claim 1, in which said spoilable material is meat and said liquefied gas is liquid nitrogen.

5. A system as set forth in claim 1, in which said sealing means comprises a flexible gasket between said container and cover, and in which said system further comprises, between said tank and container, means sensitive to the temperature inside the container for supplying said nitrogen gas when said temperature exceeds a predetermined maximum temperature.

6. A system as set forth in claim 1, in which said predetermined pressure is in the neighborhood of one-fourth of a pound per square inch, gage.

7. A system as set forth in claim 1, in which said spoilable material is fish, said liquefied gas is liquid nitrogen, and said container is adapted to be placed in a hold of a fishing vessel.

8. A system as set forth in claim 3, in which a major portion of said casing is network providing a multiplicity of said holes.

9. A system as set forth in claim 3, in which said casing is removable from said container and comprises: a frame of joined braces; and network, attached to said braces, having meshes that provide a multiplicity of said gas-transmitting holes.

10. A system as set forth in claim 9, in which said frame and network are of metal.

11. A system as set forth in claim 9, in which said frame is of corrosion-resistant metal.

12. A system as set forth in claim 11, in which said casing is rectangular, said braces are joined by welding and said network is permanently attached to said braces.

13. A system as set forth in claim 3, in which said casing is a basket, holding spoilable material and removable with its contents from said container, comprising: a frame of connected bracing members, having wide spaces between the members; mesh attached to the bottom and sides of the frame, providing a multiplicity of holes for the passage of cold gas through the mesh and into the spoilable material; handles at the upper part of the basket; and means connecting the handles to upper bracing members.

14. A system as set forth in claim 1, in which said support means comprises: a plurality of casings for holding said spoilable material, located above at least a portion of said vaporizer means, and having holes in at least its bottom part, through which said cold gas moves in its upward flow from the vaporizer means to the top part of said container; a plurality of covers, each of which is located over one of said casings and is movable relative to said container; and gaskets between each of said covers and imperforate top elements of said container.

15. A system as set forth in claim 14, in which: said plurality of casings comprises pairs of upper and lower baskets; the frame of each lower basket comprises substantially horizontal top bracing members, and the frame of the basket above it comprises substantially horizontal bottom bracing members which rest on and are supported by said top members.

References Cited

UNITED STATES PATENTS

| | | | |
|---|---|---|---|
| 1,465,657 | 8/1923 | Vacatos | 62—382X |
| 1,570,009 | 1/1926 | Sanders, Jr. | 62—382 |
| 2,039,334 | 5/1936 | Nagy | 62—388 |
| 2,496,816 | 2/1950 | Schlumbohm | 62—223X |
| 3,092,974 | 6/1963 | Haumann et al. | 62—62 |
| 3,257,820 | 6/1966 | Case et al. | 62—514X |

FOREIGN PATENTS

| | | | |
|---|---|---|---|
| 520,156 | 2/1921 | France | 62—514 |
| 225,155 | 9/1910 | Germany | 62—514 |
| 505,106 | 12/1954 | Italy | 62—514 |

A. W. DAVIS, JR., Primary Examiner

U.S. Cl. X.R.

62—49, 50, 52, 382, 388